United States Patent
Angione et al.

(10) Patent No.: US 6,382,082 B1
(45) Date of Patent: May 7, 2002

(54) HYDRAULIC CONTROL DEVICE FOR MOTOR VEHICLE CLUTCH

(75) Inventors: Pasquale Angione; Frédéric Rey, both of Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/673,973
(22) PCT Filed: Feb. 25, 2000
(86) PCT No.: PCT/FR00/00481
   § 371 Date: Dec. 8, 2000
   § 102(e) Date: Dec. 8, 2000
(87) PCT Pub. No.: WO00/50281
   PCT Pub. Date: Aug. 31, 2000

(30) Foreign Application Priority Data

Feb. 26, 1999 (FR) ............................................. 99 02427

(51) Int. Cl.[7] ................................................. F16J 15/18
(52) U.S. Cl. ........................................................ 92/168
(58) Field of Search ............................. 92/165 R, 168; 60/533

(56) References Cited

U.S. PATENT DOCUMENTS

| | | | |
|---|---|---|---|
| 4,685,300 A | * 8/1987 | Steer | 92/168 |
| 4,989,498 A | * 2/1991 | Mori et al. | 92/168 |
| 5,074,197 A | * 12/1991 | Mori et al. | 92/165 R |
| 5,187,934 A | * 2/1993 | Mori | 92/165 R |
| 5,291,974 A | * 3/1994 | Bianchi | 188/322.17 |

FOREIGN PATENT DOCUMENTS

FR   2 741 919 A   * 6/1997

* cited by examiner

Primary Examiner—F. Daniel Lopez
Assistant Examiner—Igor Kershteyn
(74) Attorney, Agent, or Firm—Liniak, Berenato, Longacre & White

(57) ABSTRACT

A device wherein the cylinder (10) comprises a cylinder body (17) wherein a piston (20) slides, and comprising an intermediate element (91) housed in the cylinder body rear part (26), for axial positioning of at least an inner sealing joint (94) co-operating with the side wall (37) of the piston (20, 36), and which is axially maintained in the rear part (26) by a cylindrical annular rear sleeve (50) mounted in the rear part (26, 56) and sealingly fixed therein by bonding or welding, in particular ultrasonic welding. The intermediate element (91) is a tubular element forming joint-holder(s) (94, 96, 120) in the inner peripheral wall (93) of which is formed at least an inner joint housing (100, 106) open radially inwards towards the side wall (37) of the piston (20, 36).

17 Claims, 3 Drawing Sheets

HYDRAULIC CONTROL DEVICE FOR MOTOR VEHICLE CLUTCH

This invention relates to an emitter or receiver cylinder for hydraulic brake or clutch control in a motor vehicle, of the type including an intermediate element.

More particularly, the invention relates to hydraulic control apparatus of the type comprising at least one control cylinder, wherein the cylinder includes a substantially tubular cylinder body, having an internal bore in which there slides axially a piston having a front face which delimits a hydraulic chamber, wherein a port for connection of a duct is open into the hydraulic chamber, wherein the cylinder body is stepped and comprises a front portion which delimits the hydraulic chamber and in which there is formed at least one front portion of the internal bore in which the piston slides, and a rear portion of enlarged diameter, the two portions being delimited by an annular transverse wall of the cylinder body, against which there bears axially an intermediate element received in the rear portion for axially positioning at least one internal sealing member which cooperates with the lateral wall of the piston, and wherein the said intermediate element is held axially in the rear portion by means of an annular cylindrical rear sleeve mounted in the rear portion and fixed sealingly in the latter by adhesive bonding or welding, especially by ultrasonic welding.

A control apparatus of this type is known from the document FR-A-2 741 919, in which sealing between the piston and cylinder body, for the purpose of preventing any leakage of pressurised fluid out of the hydraulic chamber, is achieved by means of a composite internal seal at the front, which is positioned axially by means of an intermediate element in the form of a ring, and which is received in an internal seal seating formed in the inner wall of the cylinder body, the sealing effect being completed by an internal seal of a lipped type at the rear, which is received in an internal seal seating formed in the inner wall of the sleeve.

Such a design makes it necessary to form seal seatings in different components. Assembly and fitting of the components and seals is not easy, and gives rise to risks of damaging the seals.

Finally, during an ultrasonic welding operation, there is again a danger of damage to the seals. It is therefore desirable to find a solution which is suitable for this method of welding as well as to other possible welding methods or adhesive bonding.

An object of the invention is therefore to propose means for sealing the hydraulic chamber which are simple, reliable, and easy to assemble, which do not oppose sliding movement of the piston by excessive friction effects, and which also offer the possibility for modular design of the apparatus with a view to standardising some components regardless of the number of internal sealing members and of the type of seal.

With this in view, the invention proposes an apparatus of the type described above, characterised in that the intermediate element is a tubular element constituting a seal carrier, having a peripheral internal wall in which at least one internal seal seating is formed which is open radially inwards towards the side wall of the piston.

Thanks to the invention, the seal is not sensitive to vibrations during the operation of ultrasonically welding the skirt and body together, and the seal is not in danger of damage. In addition, it is possible to form a sub-assembly consisting of the seal and tubular element, which is inserted into the cylinder body and which is then immobilised by fitting the rear sleeve in the cylinder body. The intermediate element permits more widespread standardisation of the control cylinder due to the fact that it forms a sub-assembly with at least one sealing member. This element may thus consist of an adapter member, in particular as a function of the construction of the sealing member or members, its dimensions, and particularly its axial length, depending on the application. In other versions, this member is standardised. Because of this intermediate element, it is possible to assemble the sleeve with the body by adhesive bonding, or by any type of welding compatible with the construction of the body and sleeve in plastics material.

In accordance with further features of the invention:

- the internal seal seating is open axially forward, and the seal which it receives is retained axially towards the front by the said annular transverse wall of the cylinder body, against which the intermediate seal carrier element bears axially, so that the body is simplified;
- the internal seal seating is open axially towards the rear, and the seal which it receives is retained axially towards the rear by an annular front transverse end face of the sleeve, which is thereby simplified;
- the intermediate seal carrier element carries two internal dynamic sealing members, namely a front seal and a rear seal, which are received in an internal front seating and rear seating, respectively, which are open axially towards the front and the rear respectively;
- the internal sealing member received in the said internal seating which is open axially forward is a composite seal which comprises an inner ring of material having a low coefficient of friction, which is clamped radially against the side wall of the piston by an annular external ring of elastomeric material which is received in the said internal seating;
- the internal sealing member which is received in the said internal seating open axially towards the rear is a lipped sealing cup member for radial frictional engagement;
- includes an external sealing member which is interposed operatively between the outer periphery of the intermediate seal carrier element and the inner periphery of the rear portion of the cylinder body, in order to protect the zone in which the body and sleeve are assembled together;
- the external seal is received in an external seal seating formed in the intermediate seal carrying element and open radially outwardly towards the inner periphery of the rear portion of the cylinder body;
- the said external seal seating is open axially towards the front, and the external seal which it receives is retained axially towards the front by the said annular transverse wall of the cylinder body against which the intermediate seal carrying element bears axially;
- the intermediate seal carrier element is held clamped axially between the said annular transverse wall of the cylinder body and the transverse annular front end face of the sleeve;
- the cylinder body and the sleeve are made of plastics material;
- the intermediate seal carrier element is made of plastics material;
- the free rear end portion of the sleeve projects axially beyond the rear axial end of the cylinder body and carries abutment means for limiting the axial rearward travel of the piston with respect to the cylinder body;
- the said abutment means consist of a ring including a cylindrical axial skirt which surrounds the axial rear end portion of the sleeve, with respect to which it is retained axially, the said ring that includes a transverse base having a through hole for passage of the rod of the piston, and constituting an annular transverse abutment with which the axial rear end of the piston is arranged to cooperate;

the axial skirt of the end stop ring is telescoped elastically over the axial rear end portion of the sleeve;

the transverse abutment base of the abutment ring is offset axially towards the rear with respect to the transverse axial rear end face of the sleeve;

the apparatus includes a bellows for protection and sealing, mounted on the cylinder body and on the piston rod;

the bellows includes a cylindrical axial front skirt for fastening it on the rear axial end portion of the sleeve which surrounds the skirt of the protective ring;

the piston extends through the intermediate seal carrier element with a radial clearance;

the sealed welding zone between the sleeve and the rear portion of the cylinder body is offset axially towards the rear with respect to the intermediate seal carrier element;

the sleeve is a sleeve for guiding the piston in sliding movement, and for this purpose, its internal cylindrical wall constitutes a rear portion of the internal bore of the cylinder in which the piston is mounted sealingly for sliding movement.

Further features and advantages of the invention will appear on a reading of the following detailed description, for an understanding of which, reference will be made to the attached drawings, in which:

FIGS. 1 and 2 show a receiver cylinder 10 of a hydraulic control apparatus for a motor vehicle clutch.

Figure 1:
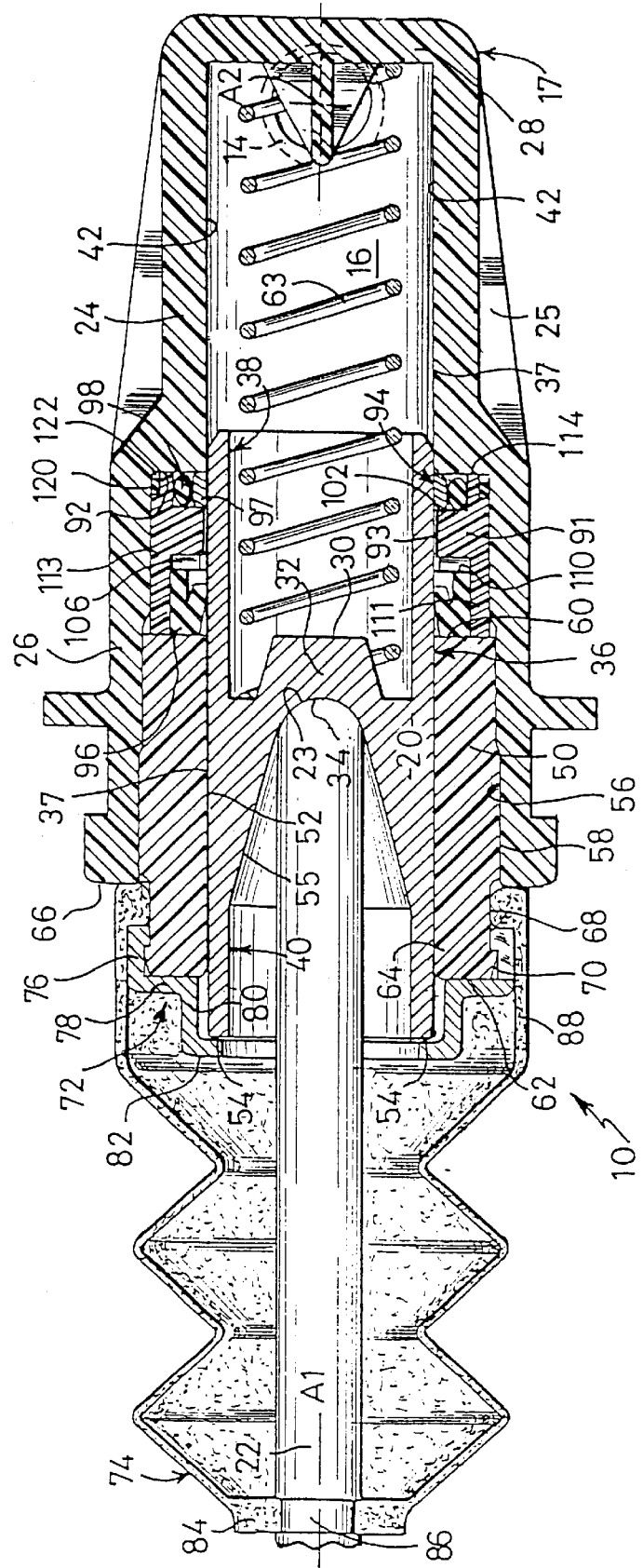
FIGS. 1 and 2 are views in axial cross section of a receiver cylinder in accordance with the features of the invention, in which the piston is shown, respectively, in a first or retracted position and in a second or deployed position.

Such an apparatus (not shown) consists essentially of an emitter cylinder, the structure of which is similar to the receiver cylinder shown here, and which has a piston which is displaced under the action of a control rod which is connected to, for example, a clutch pedal on which the driver acts. The piston of the emitter cylinder is arranged to expel a fluid, contained in a hydraulic chamber, towards a duct which connects the emitter cylinder to the receiver cylinder 10.

The duct is open through an input port in a connector 14, which itself exhausts into a hydraulic chamber 16 which is defined within a cylinder body 17 of mouldable synthetic material, or plastics material in this example, of the receiver cylinder 10, so as to cause a piston 20 to be displaced, this piston acting through a control rod 22 on, for example, a control fork for a clutch (not shown) so as to cause the clutch to be disengaged.

In another version, the piston acts in traction on the said fork through a cable.

The cylinder body 17 is generally in the form of a stepped tube on an axis A1, and it includes a front part 24 of smaller diameter than a rear part 26, which has a larger diameter.

In order to stiffen the cylinder body 17, stiffening ribs 25 are arranged all around the front part 24 of the body 17.

The hydraulic chamber 16 is defined within the front part 24 of the cylinder body 17, and it is bounded axially at the front by a transverse front wall 28 and, at the rear, by a transverse front face 30 of the piston 20.

It can be arranged that the hydraulic chamber 16 is provided with axial grooves (not shown) which are for example formed integrally by moulding with the body 17, and which are arranged circumferentially in correspondence with the stiffening ribs 25. The grooves, in particular, enable an improved distribution of the contact pressure between the piston 20 and the cylinder body 17 to be guaranteed, and also prevent there being any thickened portions of the material within the cylinder body 17 in the region of the ribs 25, which is of particular importance in the case of a component formed by moulding.

In addition, the connector 14 is open radially on an axis A1 into the hydraulic chamber 16, which enables the axial size of the receiver cylinder 10 to be reduced.

Figure 2:
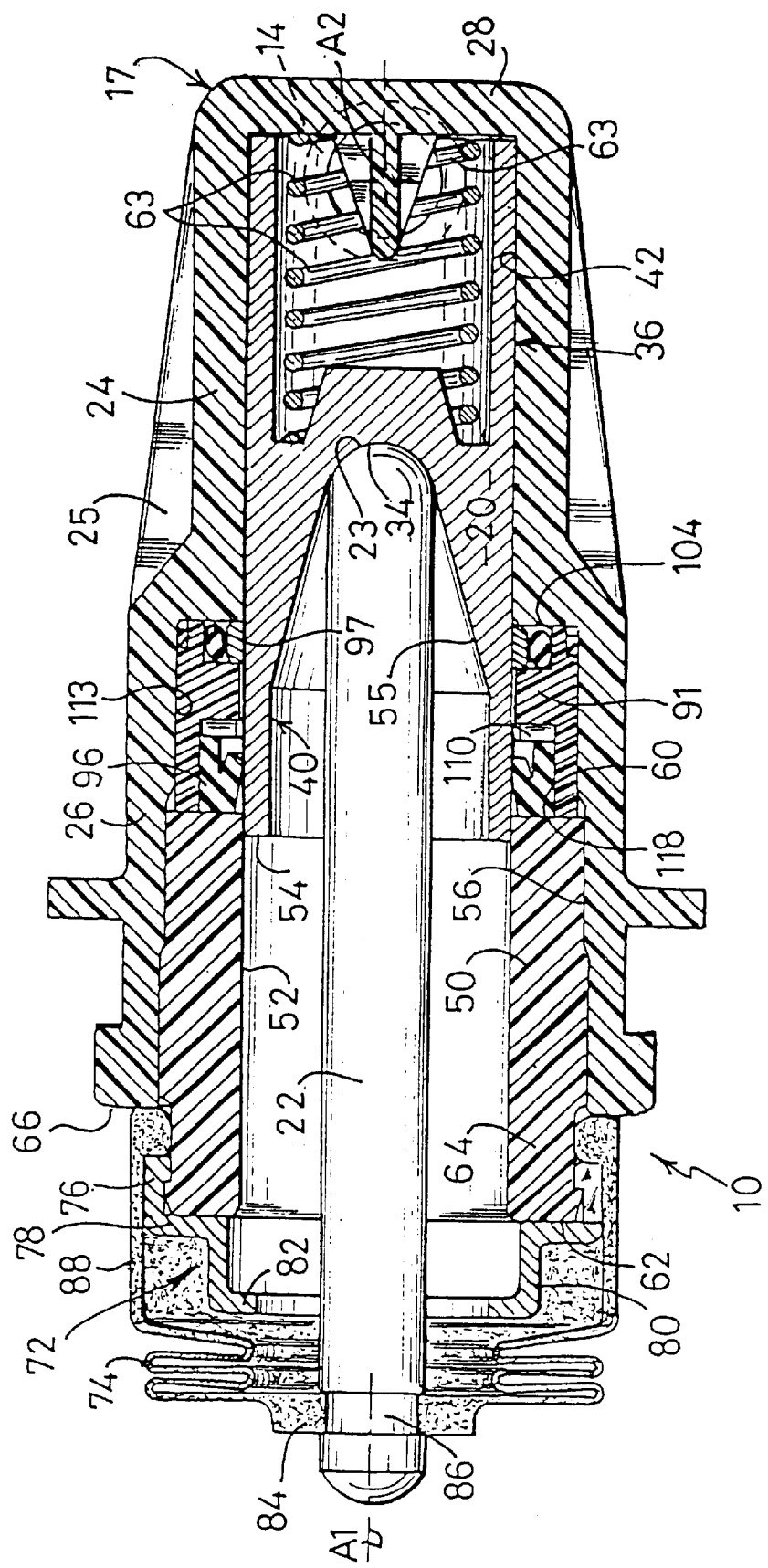
Figure 3:
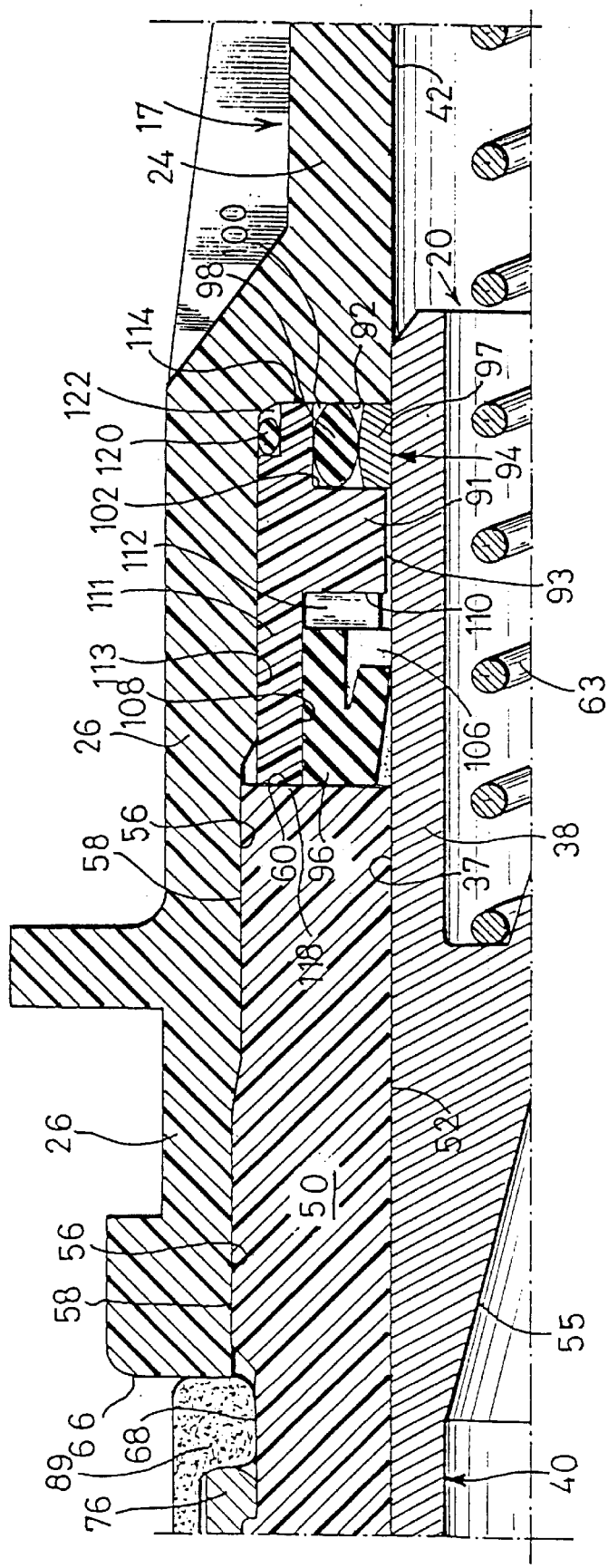
FIG. 3 is an enlarged view of a detail of FIG. 2.

The volume of the hydraulic chamber 16 is arranged to vary as a function of the axial position of the piston 20 in the cylinder body 17, the piston 20 being arranged to slide axially between a first or deployed position shown in FIG. 1, and a second or retracted position shown in FIG. 2.

The piston 20 which is shown in these Figures is made by moulding in plastics material, but it may also be envisaged that it can be made by press-forming in metal plate, for example of steel or aluminum alloy.

The piston 20 consists essentially of a transverse wall 32, the front face 30 of which bounds the hydraulic chamber 16, and it has a rear face 34 which cooperates with the control rod 22, together with a cylindrical lateral skirt 36 which guides the piston 20 in the cylinder body 17.

More precisely, the transverse wall 32 has a hemispherical central portion 34 with the same radius of curvature as the end 23 of the control rod 22, and connected to the rear axial end 54 of the skirt 36 through a conical portion 55 which permits a slight angular displacement of the control rod 22 to take place about its front end 23.

In an apparatus for the hydraulic control of a clutch, the pressure in the fluid is liable to reach values of the order of 30 to 40 bars, and it is therefore necessary to ensure, firstly, excellent guidance for the piston in the cylinder body 17 in order to avoid any danger of interference or jamming, and secondly to ensure very high quality sealing that is capable of resisting such pressures.

With a view to improving the guidance of the piston 20, the annular skirt 36 extends axially over a length the value of which is between 3 and 4 times the value of its diameter, and accordingly, it includes, on either side of the transverse wall 32 of the piston 20, a tubular front portion 38 and a tubular rear portion 40.

The tubular front portion 38 of the skirt 36 is arranged to cooperate more particularly with an internal cylindrical surface 42 of the front portion 24 of the cylinder body 17, which delimits the hydraulic chamber 16 that constitutes the front portion of the internal bore of the body 17 in which the piston is mounted for sliding movement.

The rear portion 40 of the skirt 36 of the piston 20 slides axially in the rear portion 26 of the cylinder body 17.

More precisely, the rear portion 40 is in cooperation with a rear guide sleeve 50 which is mounted axially in the large-diameter rear portion 26 of the body 17, and which has a cylindrical inner surface 52 the diameter of which is substantially equal to the diameter of the cylindrical inner surface 42 of the front portion 24 of the body 17, with which it is coaxial so as to constitute the rear portion of the internal bore of the cylinder.

The front portion 38 of the annular skirt 36 of the piston 20 delimits a cylindrical housing which serves as a guide for a compression spring 63, which is interposed in the hydraulic chamber 16 between the transverse front wall 28 of the main body 18 and the transverse front face 30 of the piston 20, with a view to forcing the piston 20 into contact with the control rod 22.

In a similar way, the tubular rear portion 40 of the annular skirt 36 delimits a cylindrical housing in which the front axial end of the control rod 22 is received.

The rear sleeve 50 is force-fitted axially from the rear towards the front in the rear portion 26 of the cylinder body 17, which has for this purpose an internal bore 56 the diameter of which is greater than the front part of the internal bore 42, thereby giving the cylinder body 17 a generally stepped tubular form.

The rear sleeve 50 is a component made in plastics material, in a generally tubular form which is coaxial with the cylinder body 17 on the axis A1, and it is delimited by its internal bore portion 52, its cylindrical outer face 58, and two annular transverse end faces, namely a front end face 60 and a rear end face 62.

The length of the rear sleeve 50 is such that, when it is mounted within the bore 56, its longitudinal rear end portion 64 projects axially towards the rear beyond the rear annular transverse end face 66 of the rear portion 26 of the cylinder body 17.

The outer periphery of the rear end portion 64 includes an internal radial groove 68 and a fitting chamfer 70.

Fitted in the groove 68 are, firstly, an end stop ring 72 for the piston 20, and secondly, the front end portion of a protective and sealing bellows 74.

The end stop ring 72 is a component moulded in rigid or semi-rigid plastics material, and includes at its front end a cylindrical axial skirt 76 which is split axially at the front so as to constitute fingers for fastening and resilient clipping engagement of the end stop ring 72 on the rear end portion 64 of the rear sleeve 50.

The ring 72 is positioned axially by a transverse wall 78 of the ring which is an axial extension of its front axial skirt 76 in abutment against the annular axial transverse end face 62 that is itself extended by a rear annular skirt 80, which, as can be seen in FIG. 1, surrounds the rear tubular portion 40 of the piston 20 when the latter is in its retracted position. Axial abutment of the piston 20 at the rear is ensured by a rear transverse base portion 82 of the end stop ring 72, with a hole through this base.

The perforated transverse base 82 is an inward radial extension of the rear axial skirt 80, and it serves as an abutment through its front face for the annular rear transverse end face 54 of the piston 20.

The sealing bellows 74 is of a generally known design, being of accordion form of elastomeric material.

Its rear end 84, in the form of a bead, is received in a groove 86 of the rod 22, while its front end is configured as an axially oriented skirt 88 which radially surrounds on the outside the skirt 76 of the end stop ring 72, and which is terminated by an internal radial bead 89 received in the front axial portion of the groove 68, in which it is held axially by the fastening fingers 76 of the end stop ring 72.

In accordance with one feature of the invention, the rear sleeve 50 is fixed sealingly in the cylinder body 17 by a welding operation of the type with indirect application of heat, in particular by ultrasonic welding or by the use of at least one energy source of the laser type, preferably one that emits radiation in the form of a beam in the infrared range. In that case, one of the elements consisting of the body 17 and the sleeve 50 is made of a material transparent to infrared radiation, while the other one is not transparent to infrared radiation, depending on the position of the laser with respect to the body 17. For example, when the laser is placed outside the body 17, it is the latter which is made of a material transparent to infrared radiation emitted by the laser, while the sleeve 50 is not transparent to that radiation. For example, the sleeve 50 is in a material identical to that of the body 17 and contains additives, such as carbon in an amount of 1% to 2%, so as to absorb the infrared radiation. In another version, the components 17, 50 are of different materials. There is relative movement between the laser and the body during the welding operation.

This welding operation is performed in the interface zone 56–58 between the outer periphery of the sleeve 50 and the inner periphery of the bore which receives it, preferably with axial gripping so as to complete the weld in the case where the weld is of the laser type. In another version, welding is replaced by an adhesive bonding operation.

In order to ensure the seal of the cylinder assembly 10, and in accordance with the features of the invention, an intermediate element 91 is provided which constitutes a seal carrier, also referred to as a seal box, which is fitted so that it is clamped axially between the front transverse annular end face 60 of the rear sleeve 50 and the transverse wall 92, which together define the small-diameter front portion 42 and the large-diameter rear portion 56 of the stepped internal bore of the cylinder body 17.

The seal box 91 is a component moulded in plastics material which, in the example shown in the drawings, carries two internal sealing members, namely a front seal 94 and a rear seal 96, which are of a generally known design.

The solid central portion of the seal box 91 has a cylindrical central hole 93 through which the piston 20, 36 passes with a radial clearance between the outer periphery 37 of the piston 20 and the cylindrical internal wall of the central hole 93.

By way of example, the front sealing member 94 is a dynamic seal which cooperates with the outer cylindrical surface 37 of the skirt 36 of the piston 20, and in the example shown in the drawings it is a composite seal, the structure of which is designed and shown in detail in the document FR-A-2 741 919.

The composite seal 94 consists of an inner ring 97 with a low coefficient of friction, which is gripped radially on the inside by an outer annular ring 98 of elastomeric material, which, with the inner ring 96, is received in a first internal seating 100 formed at the axial front end of the seal box 91, this seating being open axially forward and delimited axially at the rear by a transverse rear wall 102, being delimited radially on the outside by an annular cylindrical wall 104 against which the ring 98 bears elastically.

The composite seal 94 is thus retained axially in its internal seal seating 100, between the mutually facing transverse faces 102 and 92.

In accordance with a known design, the second dynamic seal 96 carried by the rear end of the seal box 91 is a seal in the form of a lipped and dished sealing ring, which is mounted in an internal seal seating 106 which, like the first seating 100, is open radially inward towards the outer cylindrical surface 37 of the piston 20, being open axially at the rear facing the annular front transverse end face 60 of the rear sleeve 50.

The internal housing of the rear seal 106 is bounded radially on the outside by a cylindrical annular wall 108, and axially at the front by a front transverse wall 110, which includes a set of ribs 112 formed in relief and spaced apart circumferentially at regular intervals so as to ensure good functioning of the lipped seal 96.

The two internal seal seatings 100 and 106 are separated axially from each other by the solid central portion of the seal box 91, which also includes a cylindrical tubular external skirt portion 111 which is received axially in a complementary front portion 113 of the internal rear bore 56 of the cylinder body 17, the portion 113 having a slightly reduced diameter.

The axial fitting position of the seal box 91 is determined by its transverse front end face 114 coming into abutment against the radial shoulder 92, while the rear sleeve 50 positions the seal box 91 axially by cooperation of its annular transverse front end face 60 against the opposed, annular, transverse rear end face 118 of the skirt portion 111 of the seal box 91.

In accordance with another feature of the invention, the seal box 91 also carries an external static sealing member 120, which is a sealing ring arranged radially on the outside in an external seal seating 122 formed in the outer peripheral wall of the skirt portion 111 of the seal box 91, this seating being open axially forward.

For assembly purposes, the assembly consisting of the internal seals 94, 96 and external seal 120 is fitted on the seal box 91, which is introduced axially into the cylindrical body 17 of the cylinder 10 until it comes into engagement against the radial shoulder 92.

The rear sleeve 50 is then introduced, and the sleeve 50 is secured in position sealingly by the welding operation.

The piston 20 with its return spring 63 can then be introduced axially, without any danger of damage to the internal seals, which are held in place in their respective seatings in the seal box 91, thereby avoiding any shearing of the seals.

The end of the fitting operation of the assembly is performed by fitting in place the rod 22, together with the end stop ring 72 and the sealing bellows 74.

Apart from the ease of fitting the seals, the design according to the invention, which is also directed to an intermediate element 91 constituting a seal box, also enables damage to be avoided in the seals and other components during the ultrasonic welding operation which is carried out in a zone offset axially towards the rear, this zone being solid and spaced away from other, sensitive, components. This intermediate element constitutes a sub-assembly with the seals, and may be standardised in all cases. The intermediate element enables the body 17 to be assembled with the sleeve by adhesive bonding or welding.

The piston may take some other form. It may be of plastics material, or may be of metal as in the document FR-A-2 741 920. It may be of plastics material and be surrounded by a metal skirt, as described in the document FR 98 07213 filed on Jun. 9, 1998.

What is claimed is:

1. Apparatus for hydraulic control of braking or of a clutch in a motor vehicle, comprising at least one control cylinder (10), wherein the cylinder (10) includes a substantially tubular cylinder body (17), having an internal bore (42, 52) in which there slides axially a piston (20) having a front face (30) which delimits a hydraulic chamber (16), wherein a port (14) for connection of a duct is open into the hydraulic chamber (16), wherein the cylinder body (17) is stepped and comprises a front portion (24) which delimits the hydraulic chamber (16) and in which there is formed at least one front portion (42) of the internal bore in which the piston (20) slides, and a rear portion (26) of enlarged diameter, the two portions (24, 26) being delimited by an annular transverse wall (92) of the cylinder body (17), against which there bears axially an intermediate element (91) received in the rear portion (26) for axially positioning at least one internal sealing member (94) which cooperates with the lateral wall (31) of the piston (20, 36), and wherein the said intermediate element (91) is held axially in the rear portion (26, 56, 113) by means of an annular cylindrical rear sleeve (50) mounted in the rear portion (26, 56) and fixed sealingly in the latter by adhesive bonding or welding, especially by ultrasonic welding, characterised in that the intermediate element (91) is a tubular element constituting a seal carrier (94, 96, 120), having a peripheral internal wall (93) in which at least one internal seal seating (100, 106) is formed which is open radially inwards towards the side wall (37) of the piston (20, 36).

2. Hydraulic control apparatus according to the preceding claim, characterised in that the internal seal seating (100) is open axially forward, and in that the seal (94) which it receives is retained axially towards the front by the said annular transverse wall (92) of the cylinder body (17), against which the intermediate seal carrier element (91, 114) bears axially.

3. Hydraulic control apparatus according to claim 1, characterised in that the internal seal seating (106) is open axially towards the rear, and in that the seal (96) which it receives is retained axially towards the rear by an annular front transverse end face (60) of the sleeve (50).

4. Hydraulic control apparatus according to claim 1, characterised in that the intermediate seal carrier element (91) carries two internal dynamic sealing members, namely a front seal (94) and a rear seal (96), which are received in an internal front seating (100) and rear seating (106), respectively, which are open axially towards the front and the rear respectively.

5. Hydraulic control apparatus according to claim 4, characterised in that the internal sealing member (94) received in the internal seating (100) which is open axially forward is a composite seal which comprises an inner ring (97) of material having a low coefficient of friction, which is clamped radially against the side wall (37) of the piston (20, 36) by an annular external ring (98) of elastomeric material which is received in the said internal seating (100).

6. Hydraulic control apparatus according to claim 4, characterised in that the internal sealing member (96) which is received in said internal seating (106) open axially towards the rear is a lipped sealing cup member for radial frictional engagement.

7. Hydraulic control apparatus according to claim 1, characterised in that it includes an external sealing member (120) which is interposed operatively between the outer periphery (111) of the intermediate seal carrier element (91) and the inner periphery (113) of the rear portion (26) of the cylinder body (17).

8. Hydraulic control apparatus according to the preceding claim, characterised in that the external seal (120) is received in an external seal seating formed in the intermediate seal carrying element (91) and open radially outwardly towards the inner periphery (113) of the rear portion (26) of the cylinder body (17).

9. Hydraulic control apparatus according to the preceding claim, characterised in that the said external seal seating is open axially towards the front, and in that the external seal (120) which it receives is retained axially towards the front by the said annular transverse wall (92) of the cylinder body (17) against which the intermediate seal carrying element (91) bears axially.

10. Hydraulic control apparatus according to claim 7, characterised in that the said intermediate seal carrier element (91) is held clamped axially between said annular transverse wall (92) of the cylinder body (17) and the transverse annular front end face (60) of the sleeve (50).

11. Hydraulic control apparatus according to the preceding claim, characterised in that the cylinder body (17), the sleeve (50) and the seal carrier element (91) are made of plastics material.

12. Hydraulic control apparatus according to claim 1, characterised in that the free rear end portion of the sleeve projects axially beyond the rear axial end of the cylinder body and carries abutment means (72) for limiting the axial rearward travel of the piston (20) with respect to the cylinder body (17).

13. Hydraulic control apparatus according to the preceding claim, characterised in that the said abutment means consist of a ring (74) that includes a cylindrical axial skirt (76) which surrounds the axial rear end portion (64) of the sleeve (50), with respect to which it is retained axially, the said ring including a transverse base (82) having a through hole for passage of the rod (22) of the piston (20), and constituting an annular transverse abutment with which the axial rear end (54) of the piston (20) is arranged to cooperate.

14. Hydraulic control apparatus according to the preceding claim, characterised in that the axial skirt of the end stop ring (72) is telescoped elastically over the axial rear end portion (64) of the sleeve (50), and in that the transverse abutment base of the abutment ring is offset axially towards the rear with respect to the transverse axial rear end face of the sleeve.

15. Apparatus according to claim 14, characterised in that it includes a bellows (74) for protection and sealing, mounted on the cylinder body (17, 50) and on the piston rod (22, 86), and in that the bellows (74) includes a cylindrical axial front skirt (88) for fastening it on the rear axial end portion (64) of the sleeve (50) which surrounds the skirt (76, 78) of the protective ring (72).

16. Hydraulic control apparatus according to claim 1, characterised in that the piston (20) extends through the intermediate seal carrier element (91) with a radial clearance.

17. Hydraulic control apparatus according to the preceding claim, characterised in that the sealed welding zone (56, 58) between the sleeve (50) and the rear portion (26) of the cylinder body (17) is offset axially towards the rear with respect to the intermediate seal carrier element (91), and in that the sleeve (50) is a sleeve for guiding the piston (20, 36) in sliding movement, and in that for this purpose, its internal cylindrical wall (52) constitutes a rear portion of the internal bore of the cylinder in which the piston (20, 36, 40) is mounted sealingly for sliding movement.

* * * * *